Nov. 19, 1940. A. J. PENICK ET AL Re. 21,627
WELLHEAD
Original Filed Oct. 23, 1936
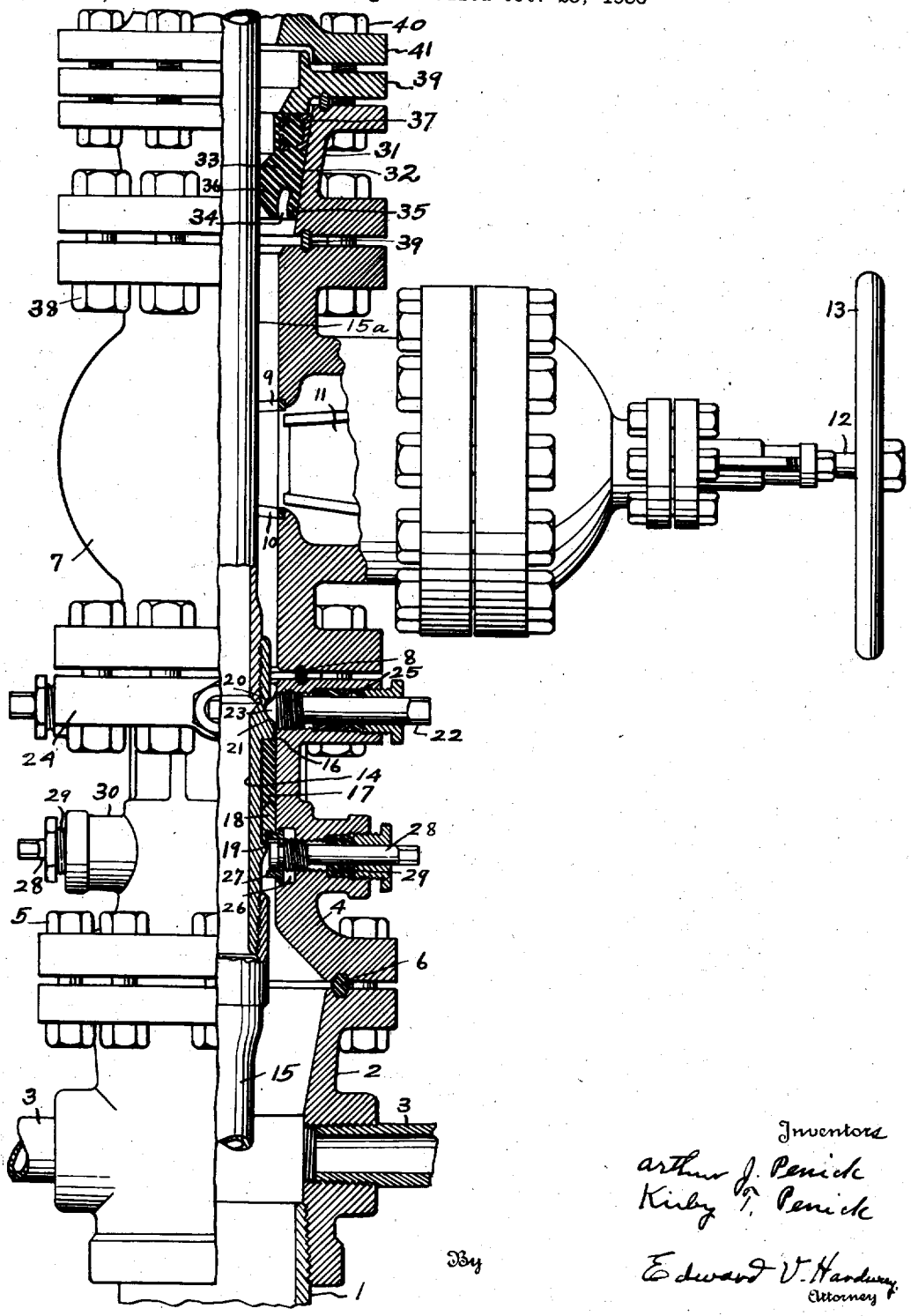
Inventors
Arthur J. Penick
Kirby T. Penick
By Edward V. Hardway
Attorney Reissued Nov. 19, 1940

Re. 21,627

UNITED STATES PATENT OFFICE 21,627

WELLHEAD

Arthur J. Penick and Kirby T. Penick,
Houston, Tex.

Original No. 2,213,503, dated September 3, 1940, Serial No. 107,234, October 23, 1936. Application for reissue September 27, 1940, Serial No. 358,732

2 Claims. (Cl. 285—22)

This invention relates to a wellhead and has particular relation to means for suspending a tubing in the well and supporting said tubing from the casing head.

It is another object of the invention to provide in combination, a casing head and a tubing hanger with novel means for supporting the hanger on the casing head whereby the hanger may be secured in place, said supporting means being retractable to permit the tubing to be elevated or lowered whereby washing fluid may be conducted down through the tubing and discharged at any desired point in the well and returned up between the tubing and well casing to facilitate the washing operation.

It is a further object of the invention to disclose a novel method of washing the well.

A still further object of the invention resides in a provision of novel means for maintaining a packing between the hanger and the casing head.

With the above and other objects in view the invention has particular relation to certain novel features of construction, arrangement of parts and use and to a novel method, an example of which is given in this specification and illustrated in the accompanying drawing, wherein:

The figure shows a side view of the head partly in section.

Referring now more particularly to the drawing the numeral 1 designates the well casing attached to the upper end of which is the casing head 2 having the side outlets 3, 3 which may be equipped with the conventional gate valve, not shown. The casing head includes a suitable bonnet 4 which may be secured thereon in any preferred manner preferably by bolts 5 with a leak proof gasket 6 between the adjacent parts. Bolted or otherwise secured on the bonnet, there is a gate valve casing 7 and the joint between said valve casing and the upper end of the bonnet may be sealed by the gasket 8. The inside diameter of the valve casing is approximately the same as that of the bonnet 4 and within the valve casing, around the passageway therethrough, are the upper and lower annular valve seats 9 and 10 which converge. A tapering valve 11 is arranged to be actuated into closed position against the seats 9 and 10 to complete the closing of the passageway through the valve casing 7. This valve may be actuated by the stem 12 in a conventional manner and this stem may be rotated by the hand wheel 13. There is a tubular tubing hanger 14 adapted to be coupled to, and to support, the tubing 15 in the well.

The upper end of the hanger 14 is internally threaded to receive the lower end of a lift pipe or nipple 15a whereby the tubing may be lowered or elevated. When the tubing is hung in place the lift nipple may be unscrewed and removed so as to permit the valve 11 to be closed.

The hanger 14 has an external downwardly facing shoulder 16 therearound and surrounding the hanger beneath and abutting said shoulder there is the annular packing 17. This packing is confined from beneath by the ring 18 which, for the purpose of assembly may be sectional or split and which rests on the external upwardly facing shoulder 19 around the hanger.

Above the shoulder 16 the hanger is provided with an external annular groove 20 whose lower side tapers downwardly and outwardly forming an annular bearing face 21 and threaded through the wall of the bonnet 4 are the retractable locking devices which comprise the outwardly extended stems 22 and the inner conical shaped ends 23 and surrounding the stems 22 and housed within the external annular flange 24 of the bonnet are the stuffing boxes 25.

Spaced beneath the locking devices is the inside annular channel 26 in the bonnet and in this channel are the retractable hanger supports 27 which have a swiveling connection with corresponding radially extended stems 28. These stems have threaded connections with the walls of the bonnet and stuffing boxes 29 surround them and are housed within the external housings 30 of the bonnet.

The stems 22 and 28 may be turned so as to retract the locking devices and supports to clear the passageway through the bonnet 4 and the tubing 15, assembled with the hanger 14 and the lift pipe 15a, may be let down into the well the desired distance and washing fluid may be forced down through the tubing to wash the well and displace the heavy drilling fluid which will be returned up through the casing 1 and out through the flow lines 3. The tubing may be then elevated or lowered and the washing continued until the well is washed clean. The tubing then may be lifted to elevate the ring 18 above the supports 27 and said supports may be moved inwardly by appropriate rotation of the stems 28 and the tubing then hung on said supports. The stems 22 may then be turned to project their inner ends 23 inwardly against the sloping face 21 to lock the hanger in place and to compress the packing 17 to the end that the tubing can not be forced upwardly or blown out by internal pressure in the well.

While the tubing is being manipulated as above explained, a seal may be maintained about the lift nipple 15a above the valve casing 7. Equipment for maintaining this seal, as illustrated, comprises a bowl 31 having an inside downwardly tapering seat 32 with a resilient pressure head 33 seated in said seat and closely surrounding the lift nipple 15a. The lower end of the pressure head is formed with an annular groove 34 providing outside and inside annular lips 35 and 36 which fit closely against the seat 32 and the lift nipple 15a respectively to maintain fluid tight joints. The pressure from beneath will enter the groove 34 so as to force the outer lip outwardly and the inner lip inwardly to maintain tight seals. The upper end of the pressure head has a rigid cage 37 whose inside diameter is sufficient to allow the pipe couplings to pass therethrough and the pressure head will yield to permit such passage while the pipe is being manipulated as hereinabove explained. The bowl may be fastened to the upper end of the valve casing 7 by means of the bolts 38 and a tight seal formed between said bowl and casing by the gasket 39.

The pressure head 33 is maintained in place during the foregoing operations by means of a clamp ring 39 which is secured in place by means of the bolts 40 and which abuts the upper end of the pressure head and a slip bowl 41 may also be secured in place above the clamp ring by means of said bolts 40.

When the well has been washed and brought in the pressure head may be removed, if desired, and the usual hook-up of flow connections made.

Before the pressure head is removed, however, the lift nipple may be unscrewed from the hanger 14 and elevated to clear the valve 11 and said valve may be closed to make the permanent flow connections above.

The drawing and description disclose what is now considered to be a preferred form of the invention by way of illustration only, while the broad principle of the invention wil be defined by the appended claims.

What we claim is:

1. A wellhead comprising a tubular casing head shaped to permit the passage of inner tubing therethrough, a tubular hanger in the head adapted to be coupled to, and to suspend, the tubing, sealing means around the hanger, an upper, downwardly facing shoulder on the hanger abutting the sealing means, an inside support movable inwardly into position to engage the lower end of the sealing means to suport the hanger and tubing suspended therefrom to cause expansion of the sealing means into fluid tight relation with the casing head, means for moving the support outwardly to clear the sealing means to permit the hanger to pass downwardly below the support and inwardly to cause the sealing means to land on the support, a lift nipple attachable to and detachable from the upper end of the hanger, a valve on the casing head, a pressure head above the valve shaped to be automatically varied in inside diameter by the tubing and hanger to permit them to pass downwardly or upwardly therethrough and to continuously maintain a fluid tight seal thereabout, said pressure head being spaced a sufficient distance above the valve to allow the detached lift nipple to be elevated into position to clear the valve to permit closing of the valve and at the same time maintain a fluid tight seal about the lift nipple whereby the well head may be maintained closed against the escape of well pressure until the valve is closed.

2. In combination a wellhead having an inside seat, sealing means on said seat shaped to surround an inner tubing through the head, a hanger adapted to be coupled into said tubing and of an outside diameter to fit snugly within the head beneath said seat, said sealing means being yieldable outwardly and of an inside diameter to form a fluid tight seal about the tubing and about the hanger, an inside retractable support beneath the sealing means, means for moving the support radially inwardly into position to engage and support the hanger, said hanger having annular sealing means therearound arranged to be expanded by the weight of the load on the hanger into sealing relation with the head and retractable means on the head above the annular sealing means movable into locking relation with the hanger.

ARTHUR J. PENICK.
KIRBY T. PENICK.